United States Patent
Pupilli et al.

(10) Patent No.: US 11,366,649 B2
(45) Date of Patent: Jun. 21, 2022

(54) COMPILATION METHOD

(71) Applicant: Graphcore Limited, Bristol (GB)

(72) Inventors: Mark Lloyd Pupilli, Bristol (GB); David Lacey, Cheltenham (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 16/865,852

(22) Filed: May 4, 2020

(65) Prior Publication Data

US 2020/0264856 A1    Aug. 20, 2020

Related U.S. Application Data

(63) Continuation of application No. 16/277,178, filed on Feb. 15, 2019, now Pat. No. 10,691,432.

(30) Foreign Application Priority Data

Jan. 3, 2019   (GB) ...................................... 1900065

(51) Int. Cl.
  *G06F 8/41* (2018.01)
  *G06F 16/901* (2019.01)
  *G06N 3/08* (2006.01)

(52) U.S. Cl.
  CPC .......... *G06F 8/458* (2013.01); *G06F 16/9024* (2019.01); *G06N 3/08* (2013.01)

(58) Field of Classification Search
  CPC ........ G06F 8/458; G06F 16/9024; G06N 3/08
  See application file for complete search history.

(56) References Cited

U.S. PATENT DOCUMENTS

| | | | |
|---|---|---|---|
| 5,317,734 A | 5/1994 | Gupta | |
| 8,181,168 B1 | 5/2012 | Lee | |
| 2008/0282207 A1* | 11/2008 | Baumgartner | G06F 30/3323 716/136 |
| 2010/0122210 A1* | 5/2010 | Dogac | G16H 30/20 715/810 |
| 2015/0138203 A1* | 5/2015 | Nachmanson | G06T 11/206 345/440 |
| 2019/0303328 A1* | 10/2019 | Balski | G06F 15/7807 |
| 2020/0159811 A1* | 5/2020 | Chatterjee | G06F 17/16 |

OTHER PUBLICATIONS

Steffen Maass, Mosaic: Processing a Trillion-Edge Graph on a Single Machine, 2017 (Year: 2017).*
Combined Search and Examination Report for United Kingdom Patent Application No. GB1900065.2, dated Aug. 21, 2019. 7 pages.

* cited by examiner

Primary Examiner — Chat C Do
Assistant Examiner — Bradford F Wheaton
(74) Attorney, Agent, or Firm — Haynes and Boone, LLP

(57) ABSTRACT

A method for generating a program to run on multiple tiles. The method comprises: receiving an input graph comprising data nodes, compute vertices and edges; receiving an initial tile-mapping specifying which data nodes and vertices are allocated to which tile; and determining a subgraph of the input graph that meets one or more heuristic rules. The rules comprises: the subgraph comprises at least one data node, the subgraph spans no more than a threshold number of tiles in the initial tile-mapping, and the subgraph comprises at least a minimum number of edges outputting to one or more vertices on one or more other tiles. The method further comprises adapting the initial mapping to migrate the data nodes and any vertices of the determined subgraph to said one or more other tiles.

18 Claims, 7 Drawing Sheets

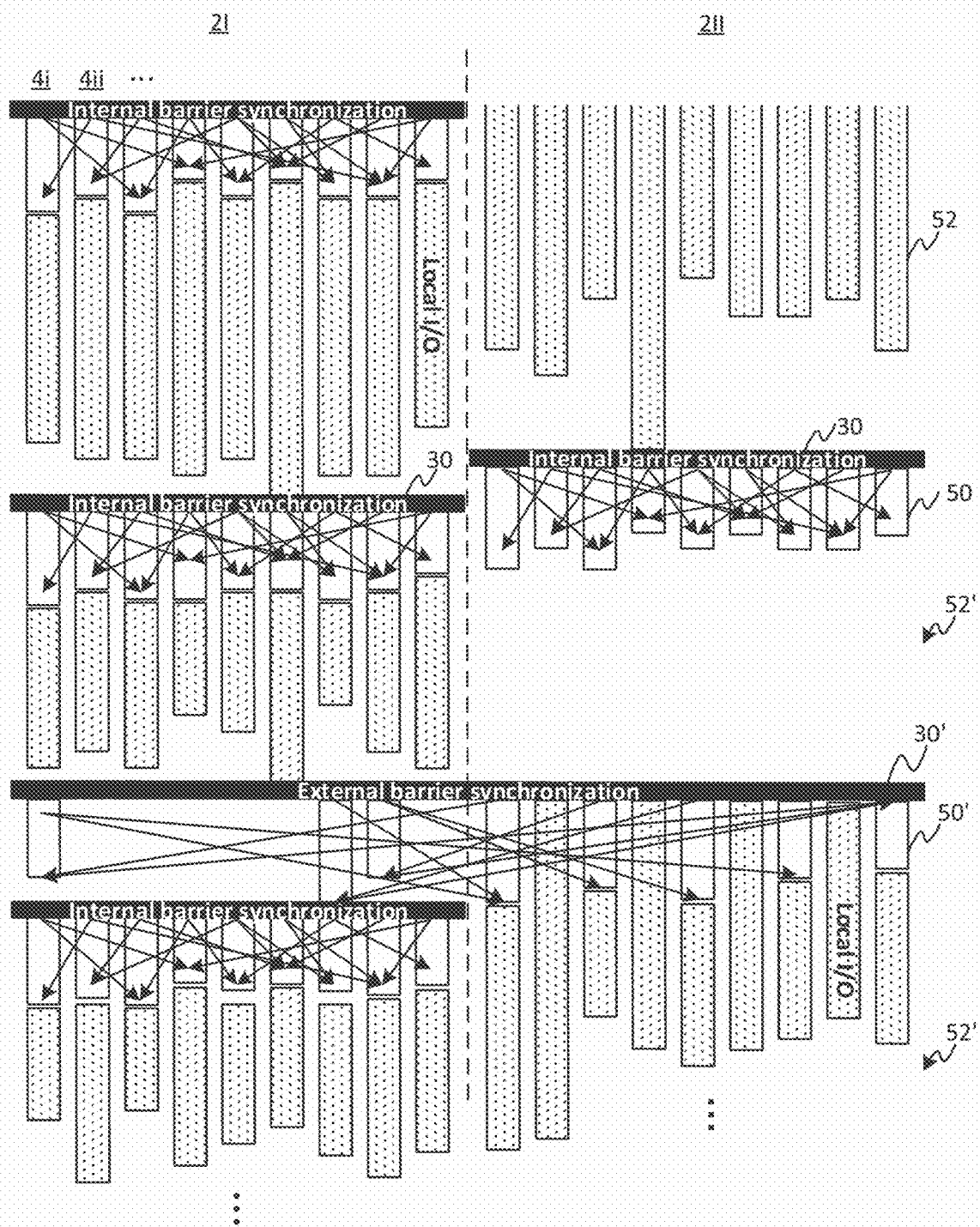

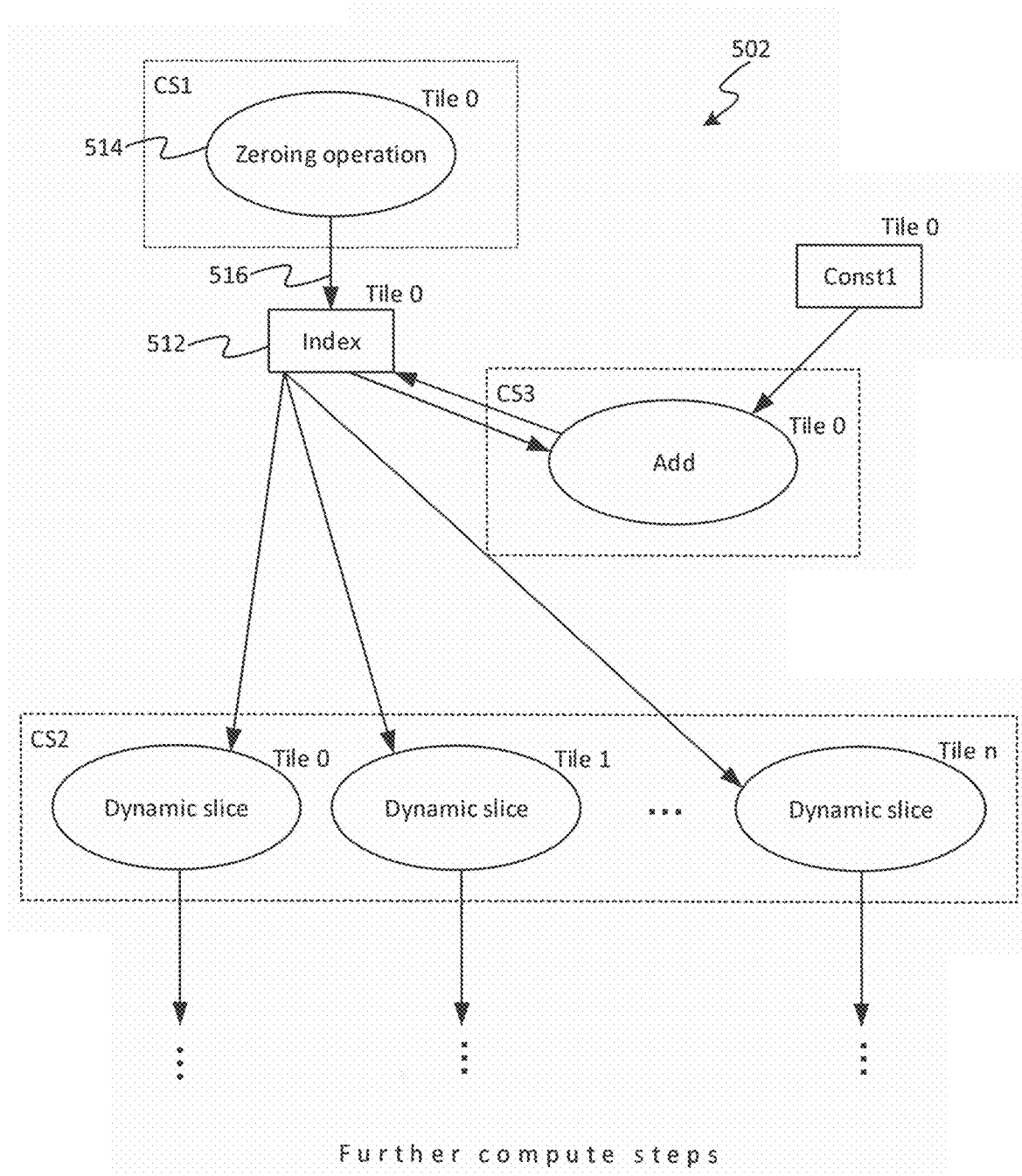

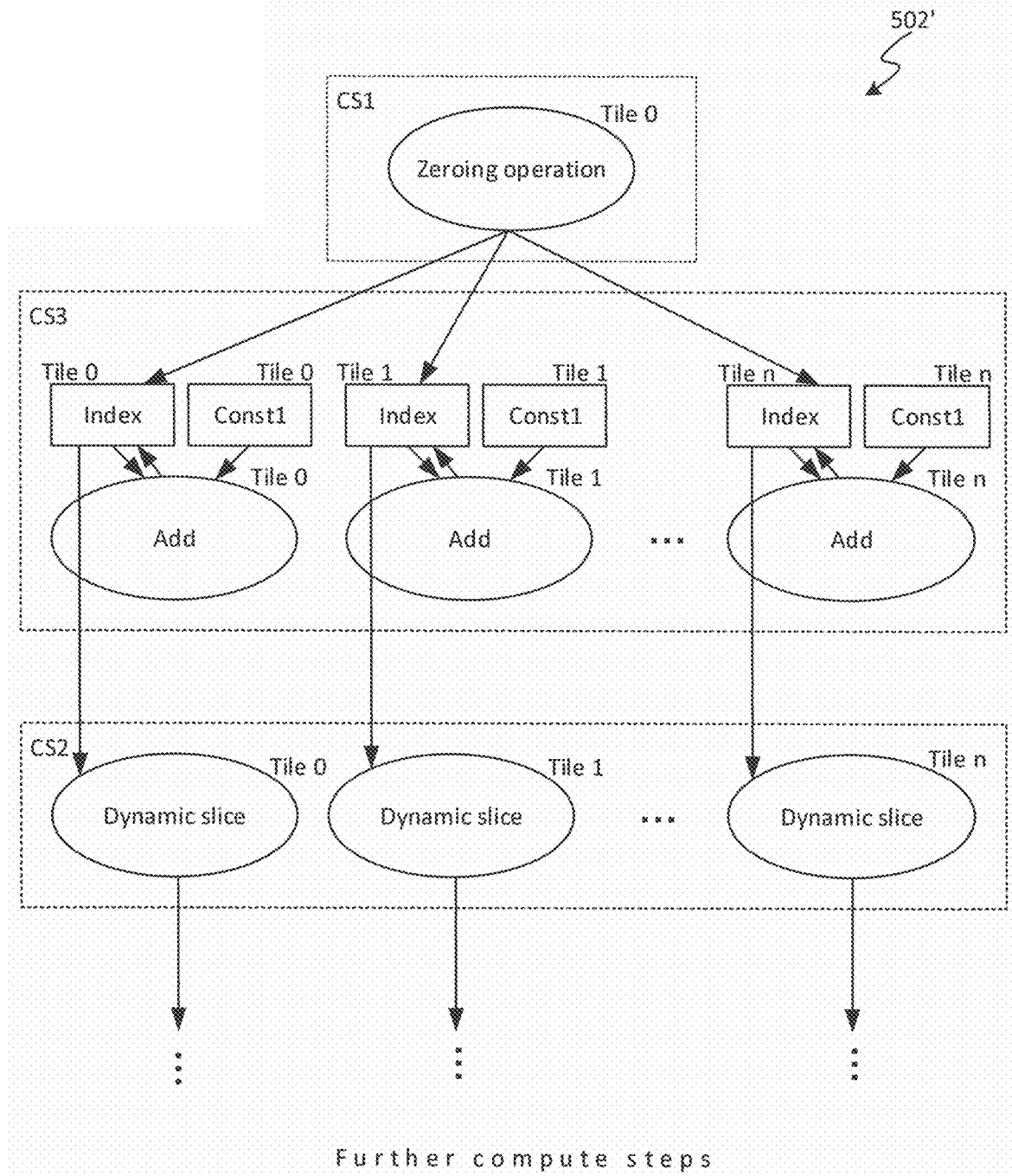

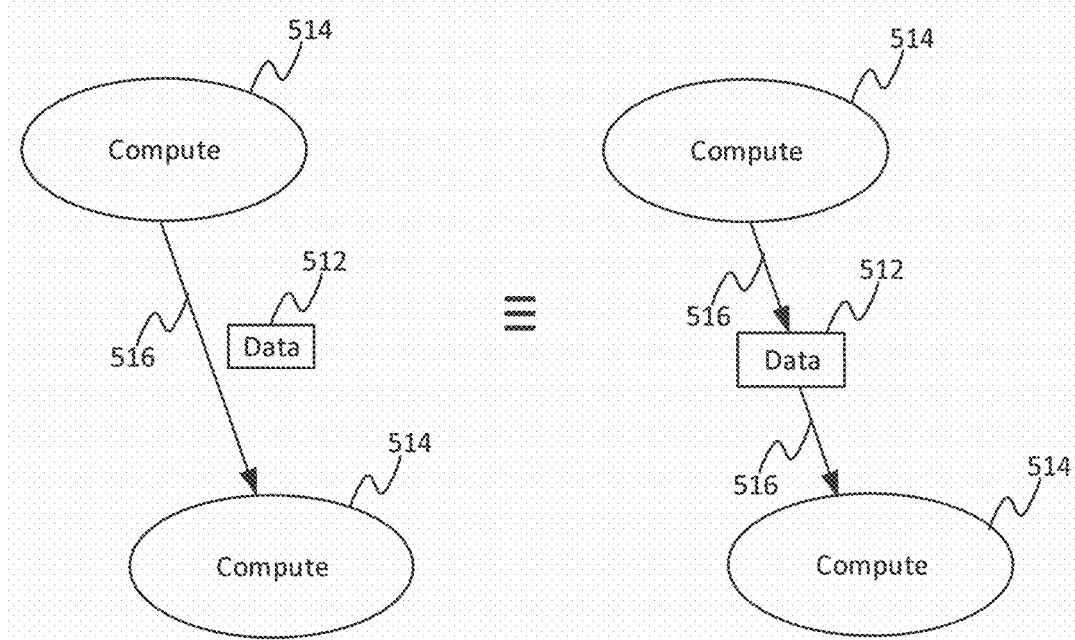

COMPILATION METHOD

CROSS REFERENCE TO RELATED APPLICATIONS

This application is a continuation of U.S. patent application Ser. No. 16/277,178, filed Feb. 15, 2019, which claims the priority benefit under 35 U.S.C. § 119 of United Kingdom Patent Application No. 1900065.2, filed Jan. 3, 2019, the entire contents of which are incorporated herein by reference.

TECHNICAL FIELD

The present disclosure relates to compiling a graph-based program to run on a processing system comprising a plurality of parallel processor modules (tiles).

BACKGROUND

Nowadays computer systems are increasingly employing parallel computing techniques. This refers to the case where multiple separate processing units are provided in parallel. For instance, parallelism can be implemented by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the pieces of code run on the different tiles to communicate with one another between tiles. In some cases, multiple different processors on different chips may be connected together via an external interconnect with each processor comprising multiple tiles. Hence it is possible to connect together multiple independent processing resources with a high degree of parallelism.

An example application of parallel processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for parallelism.

However, as computer systems grow beyond simple single-processor, single-core devices, it becomes necessary to determine how the program is to be split between the different parallel resources. Conventionally this is either specified manually by the programmer, or alternatively certain tools exist which attempt to divide the compute processing burden evenly across the parallel processing resources.

SUMMARY

An issue with existing tools is that they only attempt to balance the processing and memory burden evenly across the different parallel processing resources. They do not consider the cost of an exchange of data between tiles. The present disclosure provides a method and tool for use in compilation, which automatically migrates portions of code between tiles in order to reduce the amount of exchange between tiles.

According to one aspect disclosed herein, there is provided a computer-implemented method for generating an executable program to run on a processing system comprising one or more chips each comprising a plurality of tiles, each tile comprising a respective processing unit and memory. The method comprises receiving an input graph comprising a plurality of data nodes, a plurality of compute vertices and a plurality of directional edges, each edge representing an output from a data node input to a compute vertex or an output from a compute vertex input to a data node, each data node representing a variable and/or constant, and each compute vertex representing one or more computations to perform on the input to the compute vertex in order to result in the output from that compute vertex. The method further comprises receiving an initial tile-mapping specifying which of the data nodes and vertices are allocated to be run on which of the tiles, and determining a subgraph of the input graph that meets one or more heuristic rules. The rules comprise: the subgraph comprises at least one data node, the subgraph spans no more than a threshold number of tiles in the initial tile-mapping, and the subgraph comprises at least a minimum number of edges outputting to one or more vertices on one or more others of the tiles. The method then comprises adapting the initial mapping to migrate the data nodes and any vertices of the determined subgraph to said one or more other tiles, and compiling the executable program from the graph with the vertices and data nodes configured to run on the tiles specified by the adapted mapping.

In embodiments, the heuristic rules may further comprise a rule that all data nodes in the subgraph are scalars.

In embodiments, the heuristic rules may further comprise a rule that: any compute vertex in the subgraph outputs to at least one data node in the subgraph.

In some embodiments said threshold may be one. In embodiments said threshold is the same for both data nodes and compute vertices. Alternatively, said rule that the subgraph spans no more than a threshold number of tiles comprises a rule that: the data nodes of the subgraph span no more than a first threshold number of tiles, and the vertices of the subgraph span no more than a second threshold number of tiles wherein the second threshold is different than the first. In some embodiments, the first threshold may be one and the second threshold is greater than one, or vice versa.

In embodiments, said minimum number is one. Alternatively, in some other embodiments, said minimum number may be set to a value greater than said threshold.

In embodiments, the heuristic rules may further comprise a rule that: any compute vertex in the subgraph is allocated to the same tile as at least one data node in the subgraph in the initial mapping.

In embodiments, the vertices may be divided amongst a plurality of compute sets ordered according to an order of execution, and within each compute set there are no edges between compute vertices. In this case, said rules may further comprise a rule that: the vertices in the subgraph are all in the same compute set.

In embodiments, the determined subgraph may comprise edges outputting to compute vertices on a multiple others of the tiles. In this case the migration comprises replicating the determined subgraph across each of the multiple tiles.

That is to say, it is recognized herein that there may be some scenarios in a system of multiple interconnected tiles where, in fact, it is beneficial to duplicate portions of code and/or data across two or more tiles on the basis that exchange can be deemed more expensive than compute and/or memory resources. I.e. the delay penalty incurred by exchanging between tiles may be considered to outweigh the processing penalty of duplicating the processing, and/or the redundant memory usage incurred by duplicating data. Scenarios where such replication is deemed worthwhile are determined according to a set of heuristic rules as disclosed herein.

In embodiments, said determination of the subgraph may comprises performing a search comprising: selecting one of the data nodes as a starting point; and performing a search comprising expanding a candidate subgraph from the starting point and terminating the expansion of the candidate subgraph, or a branch thereof, upon encountering a node, vertex or edge that fails to match one or more search criteria.

In embodiments, the search criteria may comprise at least one or more of said rules that:
   the subgraph spans no more than a threshold number of tiles in the initial tile-mapping,
   the data nodes of the subgraph span no more than a first threshold number of tiles,
   the vertices of the subgraph span no more than a second threshold number of tiles wherein the second threshold is different than the first,
   all data nodes in the subgraph are scalars,
   any compute vertex in the subgraph is allocated to the same tile as at least one data node in the subgraph in the initial mapping, and/or
   the vertices in the subgraph are all in the same compute set.

Alternatively or additionally, in embodiments, said search criteria may comprise at least a condition that the subgraph has not exceeded a maximum search depth.

In embodiments, said search may be a breadth first search. Alternatively said search may be a depth first search.

In embodiments, the method may comprise performing a plurality of iterations of said search expanding from different starting points until finding a candidate subgraph that, after said termination, meets one or more filtering criteria; and selecting the found subgraph as the determined subgraph to use for said adaptation.

In embodiments, the method may comprise applying a restriction that the/each starting point must be a constant data node.

In embodiments, the method may comprise applying a restriction that the/each starting point must be a scalar data node.

In embodiments, said filtering criteria may comprise one or more of said rules that:
   the subgraph comprises at least one data node,
   the subgraph comprises multiple edges outputting to one or more vertices on one or more others of the processor modules,
   any compute vertex in the subgraph is allocated to the same tile as at least one data node in the subgraph in the initial mapping, and/or
   the vertices in the subgraph are all in the same compute set.

In embodiments, said compilation may further comprise configuring the program to synchronize between the tiles according to a bulk synchronous parallel scheme.

In embodiments, said graph may comprise a neural network, and the program comprises an algorithm configured to perform machine learning using the neural network.

In embodiments, at least some of said data nodes may represent tensors.

According to another aspect disclosed herein, there is provided a software tool comprising software embodied on computer-readable storage and configured so as when run on a computer to perform the method according to any embodiment disclosed herein.

According to another aspect disclosed herein, there is provided a computer comprising storage storing a software tool, the software tool comprising software configured so as when run on said computer to perform the method of any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
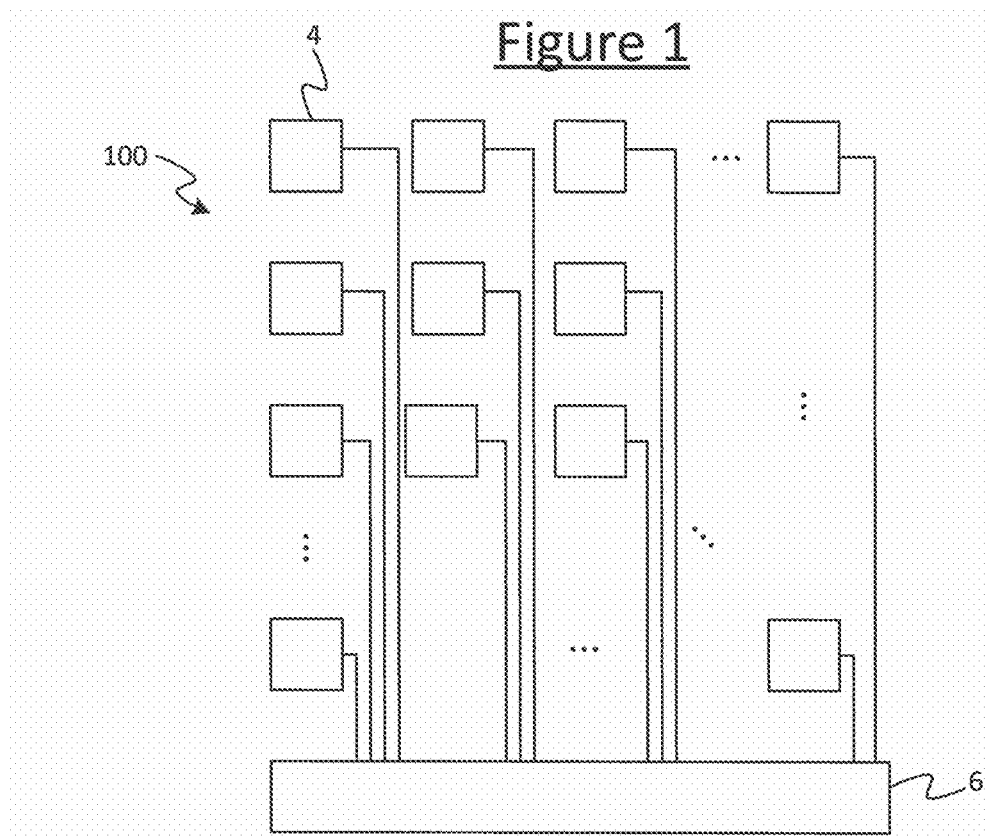
FIG. 1 is a schematic block diagram of a system comprising multiple tiles.
Figure 1A:
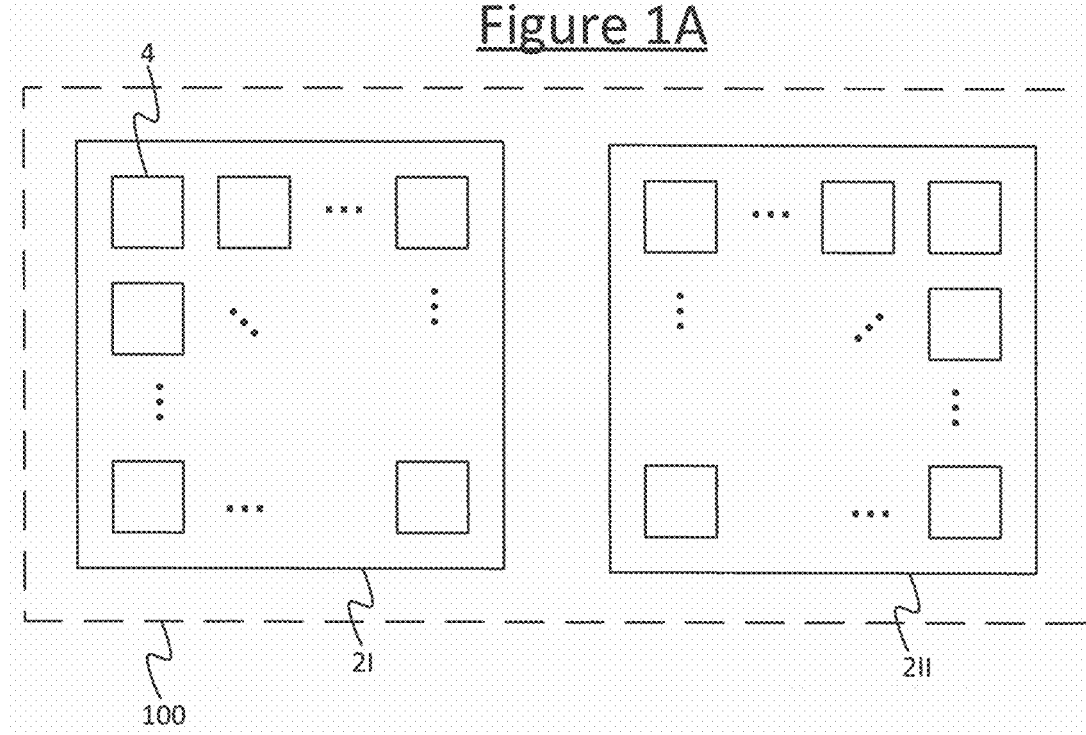
FIG. 1A is another schematic block diagram of a system comprising multiple tiles,
   FIG. 2 schematically illustrates a bulk synchronous parallel (BSP) synchronization scheme.

FIG. 1 shows an example system 100 upon which a compiled program is to be executed in accordance with embodiments disclosed herein. The system comprises a plurality of tiles 4 implemented on one or more processor chips, with multiple tiles 4 on each chip (i.e. die). FIG. 1A illustrates an example where the tiles span two chips 2I, 2II, but it will be appreciated that this is just one example and the tiles could instead all be implemented on a single chip or spread across more than two chips. Each individual tile 4 comprises its own respective processing unit (each processing unit comprising its own respective execution pipeline for executing machine code instructions). Each individual tile 4 also comprises its own memory for storing data and code. Thus the system 100 supports a great deal of parallelism, enabling parallel execution of different respective parts of the overall program on different ones of the tiles 4. For instance, the (or each) chip 2 could comprise ≥10, ≥20, ≥50, ≥100, ≥200, ≥500 or even ≥1000 tiles. E.g. in example implementations there may be 1216 or 1280 tiles per chip. Further, in embodiments each processing unit may take the form of a multi-threaded processing unit for interleaving multiple concurrent threads through the same pipeline. However this is not essential for the present purposes.

The system 100 also comprises an interconnect 6 comprising hardware logic enabling the different tiles 4 to communicate with one another, in order to exchange data, e.g. so the results of computations performed by one tile 4 can be sent to another. The interconnect 6 comprises at least an internal (on-chip) interconnect on the or each chip 2, for communicating between tiles 4 on the same chip. In embodiments where the tiles 4 span multiple chips 2, the interconnect 6 also comprises an external interconnect for communicating between tiles 4 on different chips 2.

As part of the compilation, different parts of the program are allocated to run on different ones of the tiles 4, and to exchange data with one another in order to operate together to implement the overall program as a whole. For instance the program may comprise a machine learning algorithm comprising a neural network, and different tiles 4 may run parts of the program representing different vertices of the neural network.

The different parts of the program, when compiled, are configured to synchronize with one another according to a suitable synchronization scheme such as bulk synchronous parallel (BSP), rendez vous, or the post box approach. Preferably a BSP scheme is used. This is illustrated schematically in FIGS. 2 to 2B.

A group of some or all of the tiles 4 (a "sync group") are configured to operate in a series of BSP supersteps. In embodiments the group may be some or all of the tiles 4 (in some cases a mechanism may be provided for selecting which tiles are included in a given sync group, and/or to allow one or more individual ones of the tiles 4 to opt out of the group). Each superstep comprises an exchange phase 50 followed by a compute phase 52.

In each compute phase 52, each tile 4 in the group performs one or more internal computations locally on tile, but does not exchange results of these computations with any other tiles 4. In each exchange phase 50, the tiles 4 of the group are allowed to communicate such computation results between one another (the exchanged results resulting from a preceding compute phase 52 of a preceding superstep). In some scenarios a tile 4 in the compute phase 52 may be allowed to communicate with other system resources such as a network card or storage disk, as long as no communication with other tiles in the group is involved.

Further, a barrier synchronization is placed at the juncture transitioning from the compute phase 52 into the exchange phase 50, or transitioning from the exchange phase 52 into the compute phase 50, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both.

Figure 2:
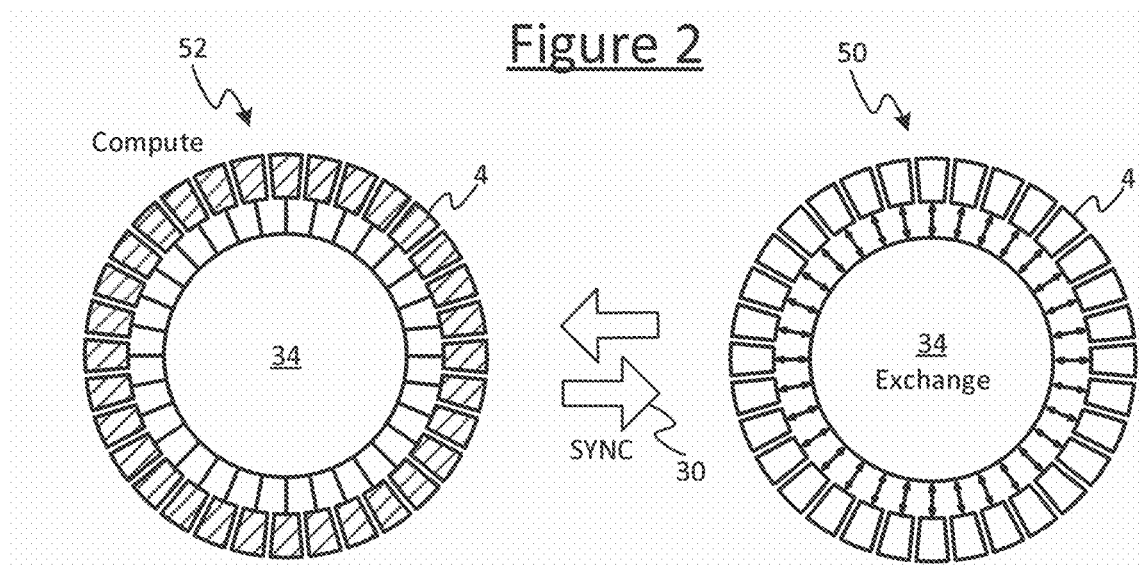
FIG. 2A is another illustration of a BSP scheme.
FIG. 2B is a schematic illustration of a BSP implemented over multiple hierarchal levels,
   FIG. 3 schematically illustrates a method of compiling a program,
   FIG. 4 schematically illustrates an example graph,
   FIG. 4A schematically illustrates an example of a graph with adapted tile mapping,
   FIG. 5 schematically illustrates two equivalent representations of a graph.
Figure 2A:
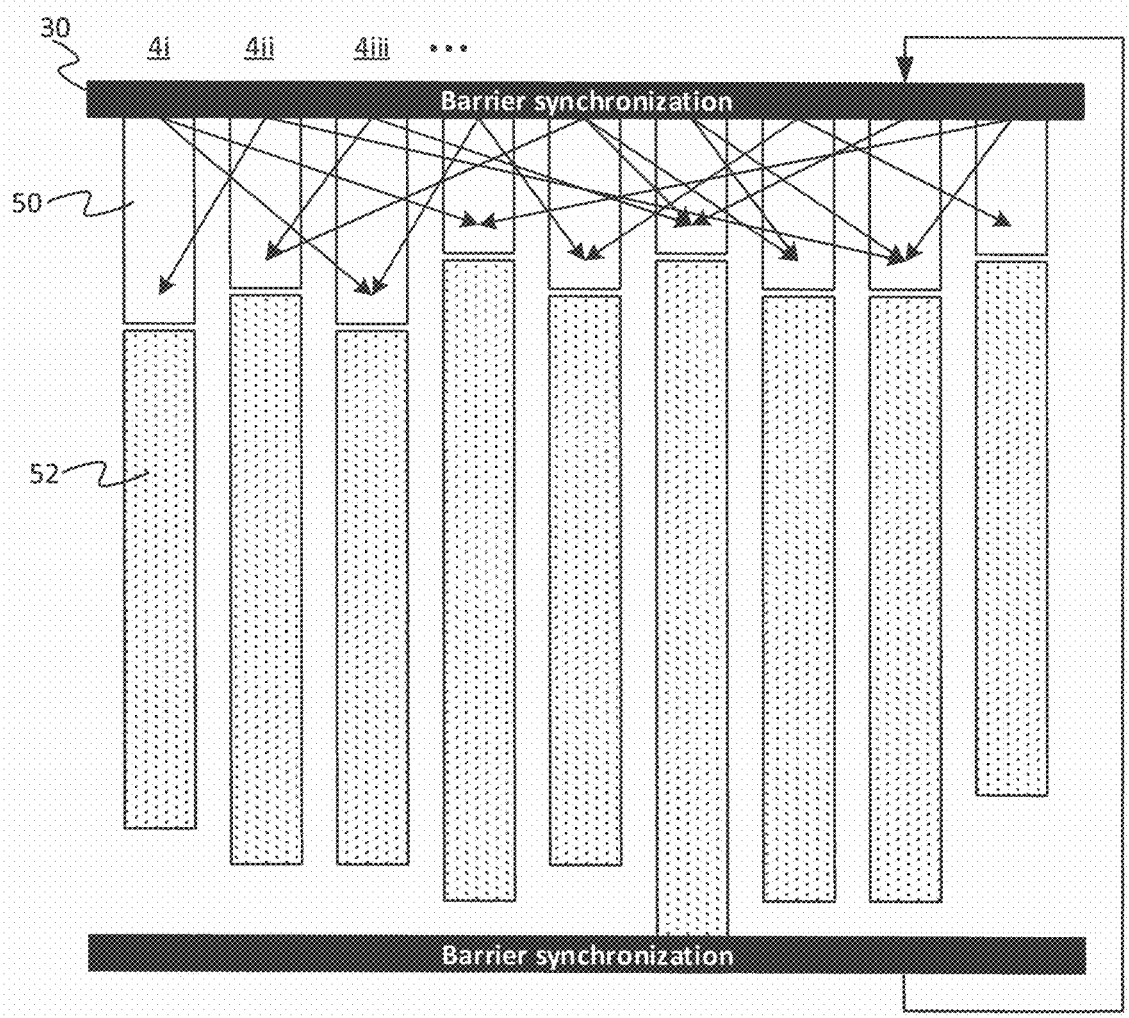

Preferably the case (a) is used, as shown in FIG. 2A. I.e. in each superstep, the compute phase 52 of the current superstep is separated from the exchange phase 50 of the next superstep by a barrier synchronization 30 (also called a synchronization barrier, or just a barrier). This means the program is configured such that all the tiles 4 in the group must complete their respective computations of the current compute 52 phase before any of the tiles 4 in the group is allowed to advance to the next exchange phase 50.

In embodiments the interconnect 6 may comprise some dedicated hardware for coordinating this. Each tile 4 in the group is programmed so as, when it has completed its respective computations of the current compute phase, it will executing a suitable instruction or instructions to send a sync request message to the interconnect 6 and then pause instruction issue until the tile 4 receives back a sync acknowledgement (sync ack) in response. E.g. in embodiments this may be enacted by executing a single dedicated sync instruction on the tile 4. The logic in the interconnect 6 is configured so as to return the sync ack to all the tiles 4 in the group on condition of receiving the sync request from all the tiles 4 in the group.

Note: in the literature the term "superstep" is not always used consistently—sometimes each of the compute and exchange phases is referred to as a superstep, whereas sometimes the exchange phase and compute phase together are referred to as a superstep. The latter terminology is adopted herein.

As shown by way of example in FIG. 2B, in embodiments the BSP scheme may be implemented over multiple hierarchical levels of sync group. E.g. referring to FIG. 1A, the set of tiles 4 on each chip 2 may form a different respective lower-level sync group, whilst a higher level sync group may be formed from all the tiles across the whole system 100. However it will be appreciated this is just one example and different arrangements of hierarchical sync groups can be formed. Whatever the division, the compiled program is configured such that, at times, each lower-level sync group is synchronous internally amongst its own tiles, but the different lower-level sync groups are allowed to run asynchronously with respect to one another. Then, at other times, all the participating tiles 4 are required to synchronize across the higher-level sync group. I.e. for certain periods, within each given lower-level sync group the compute and exchange phases are separated only by a first, lower-level barrier synchronization 30 (e.g. so the tiles in the lower-level sync group can proceed to the exchange phase of the next superstep once all the tiles 4 in the same lower-level sync group have completed their part of the current compute phase). Then, at some designated point in the program, the tiles 4 across the whole higher level sync group are subject to a second, higher-level barrier synchronization 30' (e.g. so none of the tiles 4 in the higher-level sync group can proceed to the exchange phase of the next superstep until all the tiles in the higher-level sync group have completed their part of the current compute phase). In some case, more than two hierarchical levels could be implemented based on the same principle.

Figure 3:
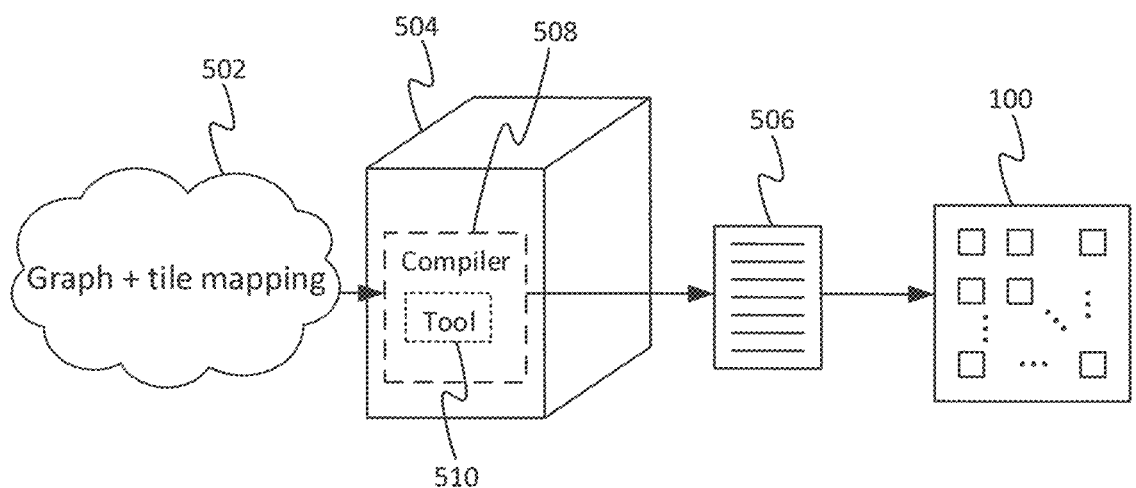

FIG. 3 illustrates an apparatus for compiling a program to run on a system 100 such as that described in relation to any of FIGS. 1 to 2B.

The apparatus comprises a computer 504, which could take the form of a server comprising one or more server units at one or more geographical sites, or one or more user terminals such as a desktop computer, or a combination of a server and one or more user terminals. The computer 504 is arranged to run a compiler 508, taking the form of software stored on computer-readable storage of the computer 504 (e.g. one or more internal and/or external magnetic disk drives and/or EEPROMs) and arranged to run on one or more processors of the computer 504 (e.g. one or more CPUs). The compiler 508, when run on the computer 504, is arranged to receive an input graph 502, and to compile the input graph 502 in order to generate an executable program 506 which can then be run on a multi-tile processing system 100 such as that described in relation to any of FIGS. 1 to 2B.

An example of an input graph is shown in FIG. 4, to be discussed in more detail shortly. The input graph 502 comprises a plurality of data nodes 512, a plurality of compute vertices 514, and a plurality of directional edges 516 each connecting between a respective pair of data node and vertex. Each data node 512 represents a variable or constant. Each edge 516 represents an output from a compute vertex 514 to a data node 512 or vice versa. Each compute vertex 514 (i.e. compute node) represents one or more computations to be performed on one or more inputs received on the edge(s) output from one or more data nodes 512, the result(s) of which is/are output to one or more data nodes 512 (typically one or more other data nodes) on the output edge(s) from the respective compute vertex 514.

The input graph 502 may be designed by a human developer to implement the data flows and computations the developer wishes (the "developer" here could be one person or a team). For instance the graph 502 may comprise a tensor flow as part of a neural network. Note that in the case where the graph 502 implements a neural network, then each node of the neural network may comprise one or more compute vertices 514 and one or more data nodes 512 of the graph 502 (i.e. of the programmatic structure of the program). I.e. the graph of the neural network may be described at a higher level of abstraction than the graph 502 of the program. The present disclosure is primarily concerned with the latter.

Note also, in some representations the same graph may equivalently be represented by compute nodes (vertices) that are connected to each other with edges and the data (variables or constants) are indicated as annotations on the edges, rather than explicitly as data nodes. This is shown in the left hand side of FIG. 5. Either representation may equivalently be used. It will be appreciated that annotations of data on edges are a schematically equivalent way of describing data nodes, and the way they are presented to the human developer in any given view in any given tool does not exclude the fact that, in substance, items of data that can be called data nodes are still present in the underlying computational structure of the graph and can still read onto the data nodes 512 disclosed herein. Put another way, a representation of an edge annotated by data is a condensed way of representing a data node with an input edge from one compute vertex and an output edge to the another vertex (see FIG. 5). The latter representation is adopted herein by way of explanation of the concepts, but it will be appreciated that in substance, a graph as claimed herein refers to the underlying computational graph and not the conceptual or graphical manner in which it is presented to a human. I.e. the graph 502 refers to the underlying data structure comprising functions and flows of data through functions; wherein the functions can be referred to as compute vertices 514 and the data input to or from such functions can be referred to as the data nodes 512, with any logical flow of data into or out of the functions/vertices being referred to as edges. The input graph 502 is also tagged with an initial tile-mapping, specifying which tile 4 of the system 100 each of the data nodes 512 and compute vertices 514 is to be implemented on in the final compiled version of the program. This (initial) tile mapping may also be specified manually by the developer. The input graph 502 and initial tile mapping are specified in a high-level language (e.g. C++) which needs compiling. For instance using C++ (with suitable libraries) the developer may write lines of high-level code such as:

```
tensor_t = g.addvariable ({...});    // add data node, e.g. a tensor
vertex_v = g.addvertex (...);        // add compute vertex
g.SetTileMapping (tensor_t, n)       // allocate tensor_t to tile number n
```

With multiple such lines of high-level code, the developer can build up a large graph (FIG. 4 shows only a small fragment of an example graph for illustrative purposes). The compiler 508 provides an API between the high-level language (e.g. C++) and the compiled version of the graph. I.e. it is the role of the compiler 508 to compile the high level program into an executable program 506 in low-level machine code instructions. As the target system 100 is a multi-tile system, the compiler 508 will need to generate the overall executable program 506 in the form of a plurality of respective constituent programs, one for each tile 4 that will be involved in the execution. The division between tiles 4 can be based on the tile mapping tagged onto the graph 502.

According to the present disclosure, the compiler 508 comprises a tile-reallocation tool 510 configured to automatically reconfigure at least part of the tile mapping before compilation by the rest of the compiler 508. The reason for the reallocation is that exchange of data over the interconnect 6 will incur a delay. Hence there may be scenarios where the input graph 502 contains one or more edges corresponding to exchanges between tiles 4, and therefore delays, that could be eliminated by migrating one or more data or compute nodes 512, 514 from one tile 4 to another. In one particular scenario dealt with herein, the developer may write only one instance of a data node 512 and/or compute vertex 514 to be implemented on a single tile 4, and arranged to share its output with multiple other tiles 4. This would be the natural way for the human developer to write the program since conventionally the ordinary programmer would try not incur redundant compute and memory resources by duplicating the same thing in multiple places, and in any case it would be cumbersome to write multiple instances of the same code. However, it is recognized herein that, in a multi-tile processor, exchange can in fact be considered more expensive than compute and memory resources in many cases. I.e. the delay penalty of the exchange may outweigh the cost of duplicating redundant instances of compute vertices or data across multiple tiles 4.

An example is illustrated in more detail in relation to FIGS. 4 and 4A. FIG. 4 shows an example of implementing a part of a graph comprising a loop counter.

The example input graph 502 comprises a first compute vertex representing a zeroing operation, a second compute vertex representing an add operation, and a plurality of third compute vertices each representing a respective instance of a dynamic slice operation. The input graph 502 further comprises two data nodes: a first data node representing a scalar variable called "index" acting as a loop count index, and a second data node representing a constant called "const1". In embodiments the constant equals 1. The first compute vertex is connected by an edge directed from the first compute vertex to the Index node. The index node is connected by an edge directed from the node to the second compute vertex, and an edge directed from the second compute vertex to the index node. The constant node (const1) is connected by an edge directed from the constant node to the second compute vertex. The second compute vertex is connected by a respective edge directed to back to the index node. Each third compute vertex is connected by edge directed from the index node to the respective third vertex, and also an edge directed to another part of the graph.

The zeroing operation of the first compute vertex writes the value zero to the variable it outputs to, in this case the index. The add operation adds the values input on its two edges, in this case the index and the constant; and writes the result back to the variable on one of its input edges, in this case the index. The dynamic slice takes two inputs: the output of the add (acting as an index of a loop count), and a tensor from which to take a slice (the latter input is not shown in order to simplify the drawings). The dynamic slice takes a dynamic slice through the tensor in dependence on the index value received on its input edge, and outputs the result on an output edge.

In embodiments the compute vertices 514 are divided amongst a plurality of ordered successive compute sets CS0, CS1, CS2, etc., where the order of the compute sets corresponds to an order of execution in the compiled program. I.e. the first compute set CS0 has to be executed before the second compute set CS2, the second compute set CS1 has to be executed before the third compute set, etc. For instance, the different successive compute steps CS1, CS2, CS3 . . . may correspond to the compute phases of different respective BSP supersteps, with the edges into the compute set corresponding to the exchange phase of the current superstep, and the edges out of the compute set corresponding to the exchange phase of the next superstep following the next barrier synchronization. That is, the edges and compute sets will be implemented in the exchange and compute phases of the corresponding supersteps in the compiled program 506. The compute sets may be set manually by the programmer when defining the vertices, e.g. by:

vertex_v=g.addvertex ( . . . , compute_set); // add vertex_v and assign to compute_set In the illustrated example, the first compute vertex (the zeroing operation) is comprised by the first compute set CS1, the second compute vertex (the scaled add) is comprised by the third compute set CS3, and the third compute vertices (the dynamic slice) are comprised by the second compute set CS2. The second compute set CS2 thus operates on a large tensor of components.

In operation, the program of the example graph in FIG. 4 initially sets index to 0 in the first compute set CS1, and then loops the set of dynamic slices in the second compute set CS2 and increments the scalar variable index each time the third compute set CS3 runs following the second compute set CS2, thus implementing a loop counter for the dynamic slice. I.e. the program will function as follows.

CS0: index=0
CS1: slice ( . . . , index)
CS2: index=index+1

Note: the loop is not represented by the compute graph 502 but by a separate control program that calls the compute sets in the appropriate order. I.e. after defining the compute sets the programmer would define the control programs with syntax such as: prog::repeat(prog::Sequence(cs0,cs1,cs2), 5), which would repeat the sequence (cs0→cs1→cs2) 5 times.

More generally the dynamic slices of the third compute set could be any function that it is desired to loop. This is just one example, as is the example of a loop counter. In further embodiments, there could also be use cases where there is no loop at all. Such cases are not excluded either.

Note that in embodiments, within a given compute set there is no interaction between compute vertices 514 on different tiles 4. In a BSP setting, this means one compute vertex 514 can't read data written by another in the same compute phase. Therefore in an exchange phase prior to a compute phase, the system 100 will need to exchange all data the vertices 514 will need for that compute phase, then each vertex can compute and produce its result on its respective tile 4.

As mentioned, the input graph 502 is tagged with an initial tile mapping assigned by the programmer. This is illustrated to the top right of each node or vertex 512, 514 in FIG. 4. In the illustrated example the first compute vertex is assigned to a tile with tile ID 0; the index node, the constant node and the second compute vertex (scaled add) are assigned to tile 1; and the third compute vertices (dynamic slices) are assigned to tiles 0 . . . n respectively. I.e. when compiled according to this mapping, the compiler 508 will place these nodes and vertices in the part of the program to be run on the respective assigned tiles 4. Thus the programmer has implemented the index node, the constant node and the scaled add on a single tile. It would be unnatural for the ordinary programmer to do otherwise, since his/her assumption would not be to duplicate the processing resources and storage across multiple tiles; and it would also be manually cumbersome to do so in terms of programming effort.

Now, it can be noticed that index and const1 are both small, scalar values, but are each needed on lots of tiles 4 (all of tiles 0 . . . n). The exchange of these values to each tile 4 across the interconnect 6 will be relatively inefficient; whereas processing and memory resource across the multiple tiles 4 are relatively abundant, at least sufficiently so to accommodate the duplication of small values or simple portions of graph. Thus some part of the graph 502 could be reallocated to different tiles to remove one or more exchanges. The following describes an example algorithm for automatically detecting such patterns and eliminating undesirable exchanges.

FIG. 4A shows an example result of such an optimization from the input graph of FIG. 4. The tile-reallocation tool 510 is configured to automatically detect small portions of the input graph 502 that could be migrated from one tile 4 to at least one other in order to eliminate one or more exchanges, and to generate a version of the input graph 502' comprising an adapted version of the tile-mapping including the migrated graph portions accordingly. In embodiments, this will involve duplicating the portion of graph across a plurality of downstream tiles 4, increasing the amount of redundant data and/or compute code but in trade-off against reduced amount of exchange over the interconnect 6.

It is this output version of the graph 502', tagged with the modified tile-mapping, that is output to the rest of the compiler 508 to be compiled into the final, executable program 506, with the portions of the executable program being assigned to respective ones of the tiles 4 according to the modified mapping.

In the example of FIG. 4A, a subgraph comprising the index data node, the constant data node (const1) and the scaled add (second compute vertex) has been duplicated across each of tiles 0 . . . n. Therefore the transfer of index and const1 has been eliminated (each duplicated subgraph can now output the current index value directly to the respective dynamic slice on the same respective tile 4).

Such opportunities can often come about, for example, in a high level tensor flow. E.g. a scenario as illustrated in FIGS. 4 and 4A could be found in a while loop.

In principle the programmer could have implemented the replication of FIG. 4A themselves manually (had they thought to do so); but with the order of hundreds of tiles 4, this would have involved individually creating hundreds of index variables (and similarly for the adds and the constants).

N.B. in embodiments CS1 could be duplicated across the tiles 0 . . . n as well. However since the zeroing is used only once, rather than in each loop, this is less significant.

The present disclosure describes an algorithm for automatically detecting opportunities for migration (including in some cases duplication) of graph portions in order to eliminate exchanges. The sub-graph migration/replication optimisation attempts to a) find 'small' connected sub-graphs that are causing exchange to other tiles, and to b) replicate those sub-graphs to the destination tiles in order to eliminate the exchange. The algorithm is based on a set of heuristic rules applied automatically by the tool 510 to find a suitable subgraph to be migrated or duplicated from one tile 4 to one or more others. In embodiments the rules may comprise the following.

I) All data nodes 512 in the sub-graph should be 'small' single regions. In embodiments the definition of 'small' is that the data node is a scalar.

II) All the data nodes 512 in the sub-graph must be on the same tile 4.

III) All the compute vertices 514 in the sub-graph must be on the same tile 4 as any/all data node(s) 512.

IV) Any compute nodes 514 in the sub-graph should write to at least one data node 512 in the sub-graph.

V) The set of data nodes 512 in the sub-graph must not be empty. The set of compute vertices 514 in the sub-graph can be empty.

VI) The sub-graph must have an 'exchange frontier/boundary'. That is, there must be output (write) edges from at least one data node 512 in the sub-graph to at least one compute vertex 514 on a different tile 4.

VII) All compute vertices 514 in the sub-graph should be in single-tile compute sets (CS).

VIII) No data node 512 in the sub-graph can be the source for a copy.

IX) If a data node 512 in the sub-graph is the destination for a copy then the source must be a constant that meets the same definition of 'small' used for the rest of the data nodes.

X) The graph is depth limited. I.e. it does not span more than a maximum threshold depth of hops, i.e. depth of edges following a given path from node to vertex, vertex to vertex and/or vertex to node.

Note, in embodiments not all of the above rules necessarily have to be applied, and some of the rules may be generalized.

As mentioned, the aim is to eliminate exchanges by migrating or replicating a subgraph onto other tiles 4. I.e. data is redundantly duplicated and/or computations are redundantly re-performed by different tiles 4, but on the basis that this is considered cheap compared to the exchange. The heuristic rules are designed both the narrow the search space and only to move subgraphs that have this trade-off.

Rule I is set so as to only duplicate data nodes incurring a small amount of memory to store (as opposed to large tensor values), and to stop the subgraph becoming arbitrarily large. Duplicating large items of data may go too far in trading off storage against exchange, especially if memory resources on each tile 4 are somewhat limited. I.e. tile memory is still a somewhat precious resource. Rule I may however be considered optional.

In some embodiments, the implementation of the definition of small in rule I may be hard-coded to be that "the size of the region in bytes must be the same as the size of the underlying element type in bytes" (i.e. scalars). In alternative implementations this may be replaced with a more sophisticated notion of 'small', especially as this definition may depend on the specific parameters of the BSP processor in question, e.g. memory size vs number of tiles, etc.

Rules II and III prevent replication of a subgraph spanning more than one tile. This stops the replication of any arbitrarily complex subgraph. The trade-off is best balanced with replication of small, simple subgraphs. Also if the subgraph could become arbitrarily large, the algorithm may end up selecting the whole graph.

Note that rule II can be generalized to say the data nodes 512 of the subgraph should not span more than a maximum threshold number of tiles 4, and rule III can be generalized to say the compute vertices 514 of the subgraph should not span more than a maximum threshold number of tiles 4. The threshold for the number of data nodes may be one or greater than one, as may be the threshold for the compute vertices; and the threshold for the data nodes may be the same or different than the threshold for the compute vertices. Rules II and III may also be described generally by saying that the subgraph should not span more than a threshold number of tiles, where the threshold may be the same or different for data nodes 512 and compute vertices 514.

Rule IV says that if a compute vertex can be replicated, then so can the data node that it outputs to. However, this is not an essential criterion.

Rule V is applied because there is no point replicating compute without data (but in some cases the subgraph could just be data—if a variable or constant on one tile is read by another, there would still be an exchange boundary that could be eliminated). It is at the edge(s) going out of the subgraph where the saving is to be made. Note: in the particular combination of heuristics described, rule V is redundant as it comes about anyway from the fact of starting the search from a constant. However, the starting point for the search is a separate heuristic choice and in in other embodiments it may be desired for the algorithm to work with other staring points. Hence it may be desirable to include this as a separately defined heuristic. E.g. the tool could allow the heuristic to be varied or turned on and off, so if the starting point heuristic is varied then rule V should still remain.

Rule VI says that if a subgraph has no exchange edges, there is nowhere to replicate to. The point of the algorithm is to find such edges. E.g. if the algorithm performs a depth-limited, breadth-first search from the starting point and finds zero exchange edges then there is no exchange to eliminate so it can stop considering this sub-graph further. It might be the case that if the search continued one tier deeper it would find some, but for practical reasons the search has to be stopped somewhere. Note that the direction of the edge matters in this rule.

In embodiments, this rule could be made stricter, to require multiple output edges outputting to one or more other tiles, in order to ensure a saving in the replication. Nonetheless, in embodiments this rule still does not necessarily require an output to multiple other tiles, since even if there are multiple edges to one other tile, this still means a lot of exchange that could be avoided.

This rule could also be generalized to at least a minimum number of output edges to one or more other tiles, where this minimum number could be set to one, two or more than two. In cases where the subgraph in question is allowed to span up to a threshold number of multiple tiles 4, then the criterion on the output edges may be that the minimum number of output edges to other the tile(s) is greater than said threshold number of tiles.

However, in embodiments there is not necessarily an explicit rule applied that the number of edges into the subgraph is smaller than the number of edges out. It is desirable that this scenario does not occur, otherwise the algorithm might end up increasing the amount of exchange. However, this scenario may be avoided as a result of one or more of the other rules (at least to a practical degree of probability). For instance, this is one reason the search begins from a scalar constant—to make ending up in the above situation unlikely and simplify the algorithm. It is not impossible to end up in the situation you describe without another rule, a problem with the lack of this rule has not been observed in practice so far.

Note that the representation adopted herein is bi-partite, so compute vertices 514 only connect to data nodes 512 and vice versa. So an edge 516 that is a write edge to another tile must connect to a vertex on that tile (indicating the data is an input to that vertex).

Regarding rule VII, a single tile compute set is one in which all compute vertices are mapped onto the same tile 4. Referring to the illustrated example, this rule sets the heuristic that CS1 and CS3 are singletons: i.e. they only compute on one tile. E.g. if CS1 and CS3 have no computation to perform on any other tile, CS1 and CS3 are single-tile compute sets. If one tile is computing and the other tiles waiting for it, then it may be better to duplicate so as to have the result available on all tiles. This uses more power but saves on exchange, saving time delay.

Rule VII helps to prevent that the algorithm ends up actually increasing the time taken for the program to run. It may be generalized to a rule that the subgraph spans fewer tiles 4 than it outputs to. In embodiments an additional criterion may be applied to this: the subgraph spans fewer tiles 4 than it outputs to as long as the tiles replicated onto were idle in that compute set. If there are compute sets that are not idle then the additional work could increase the time taken for the compute set. There then would need to be much more complicated checks to ensure that the 'exchange cycles' saved exceeds the number of 'compute cycles' added to the compute set. So to generalise the algorithm, the final set of active tiles would preferably need to be like a repeated "stamping" of the original set, have no exchange between the repeated stampings, and all the other tiles outside that group would still need to be idle.

Note however that rule VII is not essential. Without it, on average the algorithm may still improve the time taken for the program to run (averaged across all transformations performed on the input graph).

Rules II, III and IV are similar but are not identical.

Regarding rules VIII and IX, these two criteria are to keep the analysis simple. In order to replicate copies that do not meet these then the sub-graph analysis must continue from the 'other side' of the copy and its connected sub-graph would have to be replicated too. Note that since a copy is a type of compute vertex, then rules VIII and IX can be considered specific instances of the other rules. In embodiments they need not be applied as separate rules.

Rule X again prevents the graph becoming arbitrarily large. Rule X is not necessarily essential given other rules for preventing this such as rules II, III or VII. Rule X is different in than the other criteria II, II and VII for limiting the size of the subgraph, since it is limited by hop depth (length of a path through the graph), rather than number of tiles.

Note that the numerals I to X above do not imply an order in which the rules need to be applied. Although in some implementations, there may be orthogonal practical reasons for an ordering (e.g. compile time, and/or ease of implementation).

In embodiments, the tool 510 automatically finds a subgraph meeting the applied rules based on a search process that starts from a candidate starting point in the graph and then expands outwards, applying search criteria as it goes.

Each iteration of the search begins by selecting a candidate starting point for a subgraph from within the graph (starting from the input graph 502 in at least the first iteration). The candidate starting point may be selected according to one or more criteria. E.g. the starting point may be required to be a data node 512. The starting point may be required to be a scalar data node, and/or a constant. This is one way to implement rule V and in embodiments also rule I set out above. The aim here is to narrow down to a small number of likely starting points for the search, in order to narrow the search space and ensure to start with a node meeting at least one of the rules.

The search then expands or "grows" a candidate subgraph outward from the selected starting point, i.e. following paths from node to vertex, and then vertex to vertex or vertex to node, and so forth. In embodiments this search may be a breath first search: i.e. visit all nodes/vertices a radius of one hop out from the starting point around all edges, then a radius of two hops out, etc. Alternatively the search could be a depth first search: i.e. explore one path first, then go back to the starting point and explore another path, etc. Note that in embodiments, each step in the expansion ignores the direction of the edges when selecting the paths to explore (i.e. the search could go backwards up the tree instead of forward down the tree).

The search process terminates the expansion (growth) upon meeting any node or vertex 512, 514 that fails to meet one or more search criteria. "Terminate" here means the search stops exploring further. It can refer to terminating an individual branch or terminating the search of a given subgraph. In embodiments some of the rules only cause the search of a given subgraph to stop expanding the particular branch currently being explored, e.g. upon in an exchange edge this is recorded and then the rest of the search continues in order to find the remaining edges. At least one other rule however will case the search of the whole subgraph to be terminated once that rule is not met. I.e. the search stops expanding the subgraph (the search of that subgraph is completed). E.g. In embodiments, rules I and X only terminate the expansion of a branch of the subgraph (and there is another implicit rule that the search doesn't cross the exchange boundary as this is what the algorithm is actually searching for). Once the sub-graph is found then the other rules can be checked to see if the sub-graph is suitable, and if not those rules will terminate the subgraph as a whole. Or as a variant, some of the rules can be checked along the way and the search can bail early, but this is an optional implementation detail for optimization of the computational efficiency of the search.

Once the search is terminated, the candidate subgraph explored so far (excluding the failing node/vertex) is kept as at least a candidate for migrating to one or more other tiles. In embodiments, the search criteria (for determining when to terminate the expansion) may comprise at least rule X above. Alternatively or additionally, the search criteria may comprise rules II and/or III. In embodiments rule I may be applied as one of the search criteria, or alternatively it could be applied as one of the criteria for selecting a starting point. Rules IV and/or VII could be search criteria. Alternatively they could be applied as subsequent filtering criteria.

Once the subgraph expansion has been terminated, in embodiments the search process goes on to apply one or more filtering criteria to the candidate subgraph. If the candidate subgraph meets the criteria, this means it can be migrated or replicated. If the candidate subgraph does not meet any one of the filtering criteria, it is discarded as a candidate and the search starts another iteration from a new starting point. However, if the subgraph does indeed pass the filtering criteria, the tool 510 then automatically transforms the tile-mapping initially annotated onto the graph in order to migrate or replicate the found subgraph. Alternatively this could be done without the filtering step. However, as the search does not work based on a global visibility of the whole graph, it may be beneficial to apply a filtering step to check that the subgraph makes sense to replicate.

In embodiments, the filtering criteria comprise rules V and VI. They may also comprise rules VIII and IX if these are applied as separate rules. Rules IV and/or VII could be search criteria, or alternatively they could be applied as preceding search criteria.

The search goes through a plurality of iterations, beginning with a candidate starting point in the input graph 502, and then each time starting from a different candidate starting point in the newly modified graph. I.e. the mapping is transformed after each successful search and subgraph migration/replication, and then the next iteration of the search begins with as starting point in the newly transformed graph. It does not matter which starting point the search begins with or which order the transformations are performed in: they will always reduce to the same result. Note however, it is not essential to transform with each iteration. The algorithm could instead determine a plurality of candidate transformations in parallel all based on the input graph 502, and then apply some or all of the at the end of the whole process.

In embodiments, the search algorithm that is used to find sub-graphs which match the above criteria is undirected breadth first search (UBFS). Branches of the search are terminated when an edge or destination node fails to meet any of the criteria above (excepting criteria that cannot be checked until the search is complete e.g. criteria no. IV above). When the search terminates a branch due to the edge being an off-tile write from a data node then that edge is recorded as a frontier/boundary edge.

In order to cut down the search space breadth first searches are only initialised from small constants. The primary motivation for this is that it ensures loop counters in recursive neural network examples are found by the search whilst making the total analysis time very fast (order of 100s of milliseconds).

Once a sub-graph is found it is filtered for any criteria that could not be checked during the UBFS.

If a sub-graph passes all filtering then its frontier boundary is analysed to determine which tiles it needs to be replicated onto. Replication preferably happens in the following order due to dependencies and in order to avoid changing the data edge list until the final step.

i. Data nodes and vertices are replicated.
ii. Old off-tile edges are over-written with the corresponding new on tile edges.
iii. Copies (using a map from old to new IDs created in step i).
iv. New edges for the replicated sub-graph are added to the graph.

The algorithm then takes the next constant from the initial list and repeats. It is possible that a constant later in the list was already replicated, but in this case exchange will be removed so the sub-graph will not reach any exchange so fail at sub-graph criteria no. VI.

It will be appreciated that the above embodiments have been described by way of example only. For instance, the applicability of the disclosed techniques is not limited to neural networks or machine intelligence, and can more general be of use in any program that can be modelled as a graph for execution across multiple tiles. Further, the applicability of the disclosed techniques is not limited to a BSP scenario, and can also be of use in systems that employ other means for synchronizing or communicating between tiles, e.g. the rendez vous approach or post-post approach. Further, the algorithm is not limited to the exact combination of rules I to X as set out above, and these can be relaxed or generalized in any one or more of the ways already described. Further, the subgraph is not limited to being found using an expansion-based search process such as a breath first or depth search. In other embodiments the subgraph meeting the applied criteria may be found by any means, even an exhaustive search. Other variants or use cases of the disclosed techniques may become apparent to the person skilled in the art once given the disclosure herein. The scope of the disclosure is not limited by the described embodiments but only by the accompanying claims.

What is claimed is:

1. A computer-implemented method for generating an executable program to run on a processing system having a plurality of tiles, wherein each one of the tiles comprises its own respective processing unit and a memory, the method comprising:
receiving an initial tile-mapping based on an input graph, the initial tile-mapping allocating a plurality of data nodes and a plurality of vertices to the plurality of tiles in the processing system, wherein the initial tile-mapping further includes a plurality of directional edges representing inputs and outputs between the plurality of data nodes and the plurality of vertices, wherein the input graph comprises a neural network, and the executable program comprises an algorithm configured to perform machine learning using the neural network;
determining a subgraph of the input graph that meets a rule: the subgraph comprises a subset of the data nodes and has at least a first data node of the plurality of data nodes, wherein determining the subgraph comprises performing a search comprising:
selecting one of the data nodes as a starting point; and
expanding a candidate subgraph from the starting point and terminating expansion of the candidate subgraph upon encountering a node that fails to match the rule or any additional rules;
generating an adapted mapping from the initial tile-mapping by migrating the subset of the data nodes to a subset of the tiles, the adapted mapping including a duplication of at least one portion of code of the executable program or a data node of the subset of the data nodes across two or more tiles of the subset of the tiles; and
compiling the executable program to run on the subset of the tiles as specified by the adapted mapping.

2. The method of claim 1, wherein each data node of the plurality of data nodes represents an item selected from a list consisting of: a variable and a constant.

3. The method of claim 1, wherein a first one of the vertices represents a computation to perform on its respective input to result in its respective output.

4. The method of claim 1, wherein determining the subgraph further includes the following rules: a) the subgraph spans no more than a threshold number of tiles in the initial tile-mapping, and b) the subgraph comprises at least a minimum number of edges outputting to one or more vertices on the subset of the tiles.

5. The method of claim 4, wherein the threshold number of tiles is one.

6. The method of claim 4, wherein the minimum number of edges is one.

7. The method of claim 1, further comprising dividing the vertices among a plurality of compute sets ordered according to an order of execution; and wherein determining the subgraph further includes the following rule: any vertices in the subgraph are in a same compute set.

8. A computer comprising a processor and memory, the memory storing a software tool, the software tool comprising software configured so as when run on the computer, causes the computer to generate an executable program according to a method comprising:
receiving an initial tile-mapping based on an input graph, the initial tile-mapping allocating a plurality of data nodes and a plurality of vertices to a plurality of tiles in a processing system, wherein each tile comprises its own respective processor and a memory, wherein the initial tile-mapping further includes a plurality of directional edges representing inputs and outputs between the plurality of data nodes and the plurality of vertices, wherein the input graph comprises a neural network, and the executable program comprises an algorithm configured to perform machine learning using the neural network;
determining a subgraph of the input graph that meets a rule specifying that the subgraph comprises a subset of the data nodes and has at least a first data node of the plurality of data nodes, wherein determining the subgraph comprises performing a search comprising:
selecting one of the data nodes as a starting point; and
expanding a candidate subgraph from the starting point and terminating expansion of the candidate subgraph upon encountering a node that fails to match the rule or any additional rules;
generating an adapted mapping from the initial tile-mapping by migrating the subset of the data nodes to a subset of the tiles, the adapted mapping including a duplication of at least one portion of code of the executable program or a data node of the subset of the data nodes across two or more tiles of the subset of the tiles; and
compiling the executable program to run on the subset of the tiles as specified by the adapted mapping.

9. The computer of claim 8, wherein each data node of the plurality of data nodes represents an item selected from a list consisting of: a variable and a constant.

10. The computer of claim 8, wherein a first one of the vertices represents a computation to perform on its respective input to result in its respective output.

11. The computer of claim 8, wherein the software causes the computer to determine the subgraph further using the following rules: a) the subgraph spans no more than a threshold number of tiles in the initial tile-mapping, and b) the subgraph comprises at least a minimum number of edges outputting to one or more vertices on the subset of the tiles.

12. The computer of claim 11, wherein the threshold number of tiles is one.

13. The computer of claim 11, wherein the minimum number of edges is one.

14. The computer of claim 8, wherein the software causes the computer to divide the vertices among a plurality of compute sets ordered according to an order of execution; and wherein determining the subgraph further includes the following rule: any vertices in the subgraph are in a same compute set.

15. A non-transitory computer-readable medium having stored thereon computer-executable code which, when executed by a computer, causes the computer to generate an executable program according to a method comprising:
receiving an initial tile-mapping based on an input graph, the initial tile-mapping allocating a plurality of data nodes and a plurality of vertices to a plurality of tiles in a processing system, wherein each tile comprises its own respective processor and a memory, wherein the initial tile-mapping further includes a plurality of directional edges representing inputs and outputs between the plurality of data nodes and the plurality of vertices, wherein the input graph comprises a neural network, and the executable program comprises an algorithm configured to perform machine learning using the neural network;
determining a subgraph of the input graph that meets a rule specifying that the subgraph comprises a subset of the data nodes and has at least a first data node of the plurality of data nodes, wherein determining the subgraph comprises performing a search comprising:
selecting one of the data nodes as a starting point; and
expanding a candidate subgraph from the starting point and terminating expansion of the candidate subgraph upon encountering a node that fails to match the rule or any additional rules;
generating an adapted mapping from the initial tile-mapping by migrating the subset of the data nodes to a subset of the tiles, the adapted mapping including a duplication of at least one portion of code of the executable program or a data node of the subset of the data nodes across two or more tiles of the subset of the tiles; and
compiling the executable program to run on the subset of the tiles as specified by the adapted mapping.

16. The non-transitory computer-readable medium of claim 15, wherein each data node of the plurality of data nodes represents an item selected from a list consisting of: a variable and a constant.

17. The non-transitory computer-readable medium of claim 15, wherein a first one of the vertices represents a computation to perform on its respective input to result in its respective output.

18. The non-transitory computer-readable medium of claim 15, wherein determining the subgraph further includes the following rules: a) the subgraph spans no more than a threshold number of tiles in the initial tile-mapping, and b) the subgraph comprises at least a minimum number of edges outputting to one or more vertices on the subset of the tiles.

* * * * *